Patented May 18, 1954

2,678,892

UNITED STATES PATENT OFFICE 2,678,892

METHOD OF INCREASING OZONE RESISTANCE OF RUBBERY POLYMER AND PRODUCTS OBTAINED THEREBY

Mortimer T. Harvey, South Orange, N. J., assignor to The Harvel Research Corporation, a corporation of New Jersey No Drawing. Application March 10, 1950, Serial No. 149,023

12 Claims. (Cl. 117—118)

This invention relates to novel methods and to products obtained thereby. In one of its more specific aspects the invention is directed to novel methods for treating cured products and particularly vulcanized natural rubber, vulcanized rubbery copolymers of butadiene and styrene, examples of which are "G R S," vulcanized rubbery polymers of chloroprene, and vulcanized rubbery copolymers of butadiene and acrylonitriles, examples of which are "Buna N."

These various types of vulcanized rubbery materials have been marketed for considerable time. In general, these rubbery materials are vulcanized by mixing with other materials, as by milling, for example; then the mass is formed and the formed mass is heated at temperature of more than 100° C., with or without pressure, to cause a reaction whereby the rubbery material is cured or vulcanized—that is, it is less thermoplastic than the original rubbery material. A great variety of agents for vulcanizing said rubbery materials have been used and some of them are sulphur, compounds having available sulphur, selenium, peroxides, etc. These agents are generally now employed with accelerators and various other materials, such as fillers, etc.

Some of the inherent characteristics in said vulcanized rubbery materials which have not been entirely satisfactory are their poor resistance to ozone, sunlight and poor ageing in general, and poor resistance to corona.

In the course of my experimentations with said vulcanized rubbery materials, I have discovered that their resistance to ozone, corona and sunlight and their ageing generally may be considerably improved by treating said vulcanized materials with hydrogen at elevated temperatures of at least 100° C. and pressure of at least 40 pounds per square inch. The various tests which have been made on said vulcanized rubbery materials before and after said hydrogen treatment reveals the following startling facts:

While the tensile strength may be reduced about 5-10%, the elongation reduced 0-25% and the softness increases up to about 5%, the ozone resistance is at least doubled, the sunlight resistance is materially increased and the ageing in general and corona resistance are also improved.

According to this invention, all of said rubbery materials, taken alone or combined, are first vulcanized in any of the manners known to the art. Then the vulcanized material in its formed state is maintained in an atmosphere of hydrogen at 100° C. or above and generally 110° C.-200° C. and under pressure of 40 pounds or above and generally 40-5000 pounds per square inch. The time of treating said materials with hydrogen is to an extent dependent upon the temperature and pressure employed it being understood that the higher the pressure and temperature, and particularly the former, the less time is required. When the temperature is about 110° C.-140° C. and the pressure about 40 pounds per square inch; the time may be 48 hours. I prefer that the time be such that the quantity of hydrogen taken up be at least 2 cc. per square inch of material treated.

By practicing this process, I believe that hydrogenation occurs primarily at the surface of the vulcanized material whereby a thin layer thereof is hydrogenated or in some way converted to provide a skin or coating having greatly increased resistance to ozone, sunlight and corona effect and greatly improved ageing.

Therefore, these various improved materials produced in accordance with the invention may be more useful as rubber bands, electric cable insulators, tires, printing rolls, gasoline hose, insulated electric conductors, etc.

In the practical application of this invention, I shall herein briefly describe its use as applied to various commercial products in their ultimate formed state.

Example 1

A batch of vulcanized natural rubber bands are placed loosely in a perforated drum which is placed in an autoclave. The drum is constantly agitated to tumble the bands and hydrogen is admitted into the autoclave. The temperature of the interior is maintained at approximately 130° C. and the pressure of the hydrogen is kept at approximately 130 pounds per square inch. These conditions are maintained for about 48 hours. Then the hydrogen is turned off, the mass removed from the autoclave and cooled. The amount of hydrogen taken up by said vulcanized rubber bands during this treatment measured about 6 cc. of hydrogen per square inch of exposed surface of said bands.

Example 2

A length of electrical insulating tubing for electric cables or stranded copper wire electric conductors, containing a rubbery copolymer, butadiene and styrene compounded with other materials such as pitches, sulphurized oils, etc. and being a formed and vulcanized article of manufacture ready for use in today's market for the insertion of the electric conductor through the opening provided therein may, either before or after its first having the electric conductor, be placed in an autoclave. The air is removed from the autoclave and hydrogen admitted and maintained therein at approximtely 100° C. and 300 pounds per square inch of pressure. These conditions are maintained for approximately twenty-four hours. The hydrogen is turned off and the object treated removed from the autoclave.

Example 3

Printing rolls as well as gasoline carrying hoses whose outer surfaces are a combination of a rubbery polymer of chloroprene and a rubbery copolymer of butadiene and acrylonitrile, compounded with various other materials and vulcanized. These normal articles of commerce are placed in an autoclave which is then evacuated and hydrogen admitted therein and maintained at a temperature of 175° C. and pressure of 500 pounds per square inch for a period of 24 hours.

Example 4

Electric insulating tubing having an exposed surface of polymerized chloroprene together with other materials compounded therewith and vulcanized and a normal article of commerce may, either with or without having first had an electric conductor inserted therein, be placed in an autoclave which is evacuated and then filled with hydrogen and maintained at a temperature of 200° C. and pressure of 500 pounds per square inch. These conditions are maintained for approximately twenty-four hours.

Example 5

Vulcanized rubber tires as well as vulcanized rubber inner tubes which have exposed surfaces of natural rubber and a rubbery copolymer of butadiene and styrene, together with other materials compounded therewith, may also be placed in an autoclave filled with hydrogen maintained at 150° C. and pressure of 500 pounds per square inch for a period of twenty-four hours.

Thus, various formed vulcanized articles of manufacture of Examples 1–5 having a surface composed of one or more of said vulcanized materials, may be considerably improved by the practice of this invention. The methods as set forth in the foregoing examples merely serve to illustrate specific methods for treating illustrative examples of formed vulcanized articles.

While I have generally described the various articles of manufacture as being composed of vulcanized particular rubbery materials, it is to be understood that each of them, when permissible for the purposes intended, may be composed of any of said other rubbery materials. For example, in Examples 2 and 4, the vulcanized rubbery material is referred to therein respectively as a rubbery copolymer of butadiene and styrene and polymerized chloroprene. It is to be understood that any of the particular vulcanized rubbery materials herein or a combination of two or more of them may be used in said Examples 2 and 4.

Although this invention has been described in detail, it is not to be limited thereby because various changes and modifications may be made within the spirit and scope of this invention.

I claim:

1. The method for increasing the ozone resistance of the surface of a finished article of manufacture having a surface of a vulcanized material selected from the group consisting of vulcanized natural rubber, vulcanized rubbery polymers of chloroprene, vulcanized rubbery copolymers of butadiene and acrylonitrile and vulcanized rubbery copolymers of butadiene and styrene comprising treating said surface with hydrogen at a temperature of at least 100° C. and pressure of at least 40 pounds per square inch to improve the ozone resistance thereof.

2. The method for increasing the ozone resistance of the surface of a finished article of manufacture having a surface of natural rubber comprising treating said surface with hydrogen at a temperature of at least 100° C. and pressure of at least 40 pounds per square inch to increase its ozone resistance.

3. The method comprising treating a product having a surface of a rubbery copolymer of butadiene and styrene with hydrogen at a temperature of at least 100° C. and pressure of at least 40 pounds per square inch to increase its ozone resistance.

4. The method comprising treating a product having a surface of a rubbery copolymer of butadiene and acrylonitrile with hydrogen at a temperature of at least 100° C. and pressure of at least 40 pounds per square inch to increase its ozone resistance.

5. The method comprising treating a product having a surface of a rubbery polymer of chloroprene with hydrogen at a temperature of at least 100° C. and pressure of at least 40 pounds per square inch to increase its ozone resistance.

6. The method for increasing the ozone resistance of the surface of a tubing, said surface composed of vulcanized material selected from the group consisting of vulcanized natural rubber, vulcanized rubbery polymers of chloroprene, vulcanized copolymers of butadiene and acrylonitrile, vulcanized copolymers of butadiene and styrene, comprising treating said surface with hydrogen at a temperature of at least 100° C. and pressure of at least 40 lbs. per sq. in.

7. A product made according to claim 1, which product is characterized by having a thin coating of hydrogenated vulcanized rubber having greatly increased resistance to ozone, sunlight and corona effect.

8. A product made according to claim 2, which product is characterized by having a thin coating of hydrogenated vulcanized rubber having greatly increased resistance to ozone, sunlight, and corona effect.

9. A product made according to claim 3, which product is characterized by having a thin coating of hydrogenated vulcanized rubber having greatly increased resistance to ozone, sunlight, and corona effect.

10. A product made according to claim 4, which product is characterized by having a thin coating of hydrogenated vulcanized rubber having greatly increased resistance to ozone, sunlight, and corona effect.

11. A product made according to claim 5, which product is characterized by having a thin coating of hydrogenated vulcanized rubber having greatly increased resistance to ozone, sunlight, and corona effect.

12. A tubing which has been treated according to claim 6, which tubing is characterized by having a thin coating of hydrogenated vulcanized rubber having greatly increased resistance to ozone, sunlight, and corona effect.

References Cited in the file of this patent

UNITED STATES PATENTS

| Number | Name | Date |
|---|---|---|
| 1,654,844 | Staudinger | Jan. 3, 1928 |
| 1,888,264 | Goes et al. | Nov. 22, 1932 |
| 1,981,811 | Ralston et al. | Nov. 20, 1934 |
| 2,102,456 | Brill et al. | Dec. 14, 1937 |
| 2,109,495 | Marks | Mar. 1, 1938 |
| 2,449,949 | Morris et al. | Sept. 21, 1948 |
| 2,554,826 | Harvey | May 29, 1951 |
| 2,585,583 | Pinkey | Feb. 12, 1952 |